(12) United States Patent
Propheter-Hinckley et al.

(10) Patent No.: US 9,810,148 B2
(45) Date of Patent: Nov. 7, 2017

(54) SELF-COOLED ORIFICE STRUCTURE (71) Applicant: United Technologies Corporation, Hartford, CT (US)

(72) Inventors: Tracy A. Propheter-Hinckley, Manchester, CT (US); Dominic J. Mongillo, Jr., West Hartford, CT (US); Mark F. Zelesky, Bolton, CT (US)

(73) Assignee: United Technologies Corporation, Farmington, CT (US)

(*) Notice: Subject to any disclaimer, the term of this patent is extended or adjusted under 35 U.S.C. 154(b) by 187 days.

(21) Appl. No.: 14/807,602

(22) Filed: Jul. 23, 2015

(65) Prior Publication Data
US 2016/0025006 A1 Jan. 28, 2016

Related U.S. Application Data (60) Provisional application No. 62/028,598, filed on Jul. 24, 2014.

(51) Int. Cl.
F28F 5/06 (2006.01)
F02C 7/08 (2006.01)
F02C 7/18 (2006.01)
F02C 7/264 (2006.01)
F23R 3/00 (2006.01)
F23R 3/06 (2006.01)

(52) U.S. Cl.
CPC ............ F02C 7/08 (2013.01); F02C 7/18 (2013.01); F02C 7/264 (2013.01); F23R 3/002 (2013.01); F23R 3/06 (2013.01); F23R 2900/03045 (2013.01); Y02T 50/675 (2013.01)

(58) Field of Classification Search
CPC ...... F02C 7/08; F02C 7/18; F02C 7/264; F23R 3/002; F23R 3/06; F23R 2900/03045
USPC .......................................................... 165/51
See application file for complete search history.

(56) References Cited

U.S. PATENT DOCUMENTS

| 4,132,066 A | 1/1979 | Austin, Jr. et al. |
| 4,653,279 A | 3/1987 | Reynolds |
| 4,700,544 A | 10/1987 | Fucci |
| 4,926,933 A * | 5/1990 | Gray ............... B29C 47/24 165/173 |
| 6,973,419 B1 | 12/2005 | Fortin et al. |
| 7,631,502 B2 | 12/2009 | Burd et al. |
| 7,954,325 B2 | 6/2011 | Burd et al. |
| 8,056,342 B2 | 11/2011 | Shelley et al. |
| 8,443,610 B2 | 5/2013 | Hoke et al. |
| 8,739,546 B2 | 6/2014 | Snyder et al. |
| 2010/0181889 A1* | 7/2010 | Falicoff ............ F21K 9/00 313/46 |
| 2010/0242483 A1 | 9/2010 | Snyder et al. |

(Continued)

OTHER PUBLICATIONS

EP search report for EP15178264.6 dated May 2, 2016.

Primary Examiner — Davis Hwu
(74) Attorney, Agent, or Firm — O'Shea Getz P.C.

(57) ABSTRACT

A self-cooled orifice structure, that may be for a combustor of a gas turbine engine includes a hot side panel, a cold side panel spaced from the hot side panel, and a continuous first wall extending axially between the hot and cold side panels and spaced radially outward from a centerline. The structure may further include a first plurality of helical vanes projecting laterally, radially, inward from the first wall for flowing cooling air in a spiraling fashion through the cold side panel, then through the hot side panel.

15 Claims, 4 Drawing Sheets (56) References Cited

U.S. PATENT DOCUMENTS

| | | |
|---|---|---|
| 2011/0259548 A1* | 10/2011 | Moser .................. F01M 5/002 |
| | | 165/51 |
| 2013/0025288 A1 | 1/2013 | Cunha et al. |
| 2014/0182524 A1* | 7/2014 | Van Farowe ............ F01P 11/08 |
| | | 123/41.33 |
| 2015/0285497 A1 | 10/2015 | Sandoval |
| 2015/0285498 A1 | 10/2015 | Cunha et al. |
| 2016/0003477 A1 | 1/2016 | Propheter-Hinckley et al. |
| 2016/0003478 A1 | 1/2016 | Propheter-Hinckley et al. |

* cited by examiner

SELF-COOLED ORIFICE STRUCTURE

This application claims priority to U.S. Patent Appln. No. 62/028,598 filed Jul. 24, 2014.

BACKGROUND

The present disclosure relates to an orifice structure and, more particularly, to a self-cooled orifice.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and thereby generate thrust.

The combustor section typically includes a wall assembly having an outer shell lined with heat shields that are often referred to as floatwall panels. Together, the panels define a combustion chamber. A plurality of orifices, such as dilution holes, are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The orifices are generally defined by a grommet that extends between the heat shield panel and supporting shell with a cooling cavity defined therebetween. Improvements to the cooling of structure surrounding the orifice is desirable.

SUMMARY

A self-cooled orifice structure according to one, non-limiting, embodiment includes a hot side panel; a cold side panel spaced from the hot side panel; a continuous first wall extending axially between the hot and cold side panels and spaced radially outward from a centerline; and a first plurality of helical vanes projecting laterally, radially, inward from the first wall.

Additionally to the foregoing embodiment, the structure includes an outward face extending axially between the hot and cold side panels and spaced radially inward from the first wall; and wherein a plurality of helical channels are defined radially between the outward face and the first wall and defined laterally between respective adjacent vanes of the first plurality of helical vanes, and communicate through the hot and cold side panels.

In the alternative or additionally thereto, in the foregoing embodiment, the outward face is carried by a combustor igniter projecting through the hot and cold side panels.

In the alternative or additionally thereto, in the foregoing embodiment, the structure includes a continuous second wall having the outward face and an opposite inward face; and wherein the inward face defines an orifice.

In the alternative or additionally thereto, in the foregoing embodiment, the orifice is a dilution hole of a combustor.

In the alternative or additionally thereto, in the foregoing embodiment, the hot side panel is engaged to the first wall and spaced radially outward from the second wall.

In the alternative or additionally thereto, in the foregoing embodiment, the structure includes a second plurality of helical vanes projecting radially outward from the first wall and disposed at least in-part between the hot and cold side panels.

In the alternative or additionally thereto, in the foregoing embodiment, the structure includes a continuous third wall spaced radially outward from the first and second walls and extending axially between the hot and cold side panels; and wherein each one the second plurality of helical vanes extend radially between the first and third walls.

In the alternative or additionally thereto, in the foregoing embodiment, an annular trough is defined radially between the outward face of the second wall and the first wall, and communicates with and is located downstream of the plurality of helical channels.

In the alternative or additionally thereto, in the foregoing embodiment, a plurality of helical passages are defined at least between the first and third walls and respective adjacent vanes of the second plurality of helical vanes.

In the alternative or additionally thereto, in the foregoing embodiment, each one of the plurality of helical passages communicate between a common annular inlet generally defined between the first wall and the cold side panel, and an outlet communicating through the hot side panel proximate to the third wall.

In the alternative or additionally thereto, in the foregoing embodiment, the outlet is configured to form a film of cooling air across the hot side panel.

In the alternative or additionally thereto, in the foregoing embodiment, the outlet is a micro cooling circuit.

In the alternative or additionally thereto, in the foregoing embodiment, the first and second walls are generally flush with the hot side panel and project axially beyond the cold side panel.

In the alternative or additionally thereto, in the foregoing embodiment, each one of the plurality of helical channels communicate through a respective inlet in the first wall beyond the cold side panel and a common annular outlet generally defined between the hot side panel and the second wall.

A self-cooled orifice structure according to a second, non-limiting, embodiment includes a continuous first wall spaced radially outward from a centerline; a continuous second wall spaced radially outward from the first wall; a hot side panel; a cold side panel spaced axially from the hot side panel with the first and second walls extending axially between the hot and cold side panels; and a plurality of helical vanes with each vane extending radially between the first and second walls and axially between the hot and cold side panels.

Additionally to the foregoing embodiment, a plurality of helical passages are defined at least between the first and second walls and respective adjacent vanes of the plurality of helical vanes.

In the alternative or additionally thereto, in the foregoing embodiment, the plurality of helical passages communicate between at least one inlet generally defined between the first wall and a continuous lip of the cold side panel, and an outlet communicating through the hot side panel proximate to the second wall.

In the alternative or additionally thereto, in the foregoing embodiment, each outlet is configured to form a film of cooling air across the hot side panel.

In the alternative or additionally thereto, in the foregoing embodiment, the structure includes a second plurality of helical vanes projecting laterally, radially, inward from the first wall.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
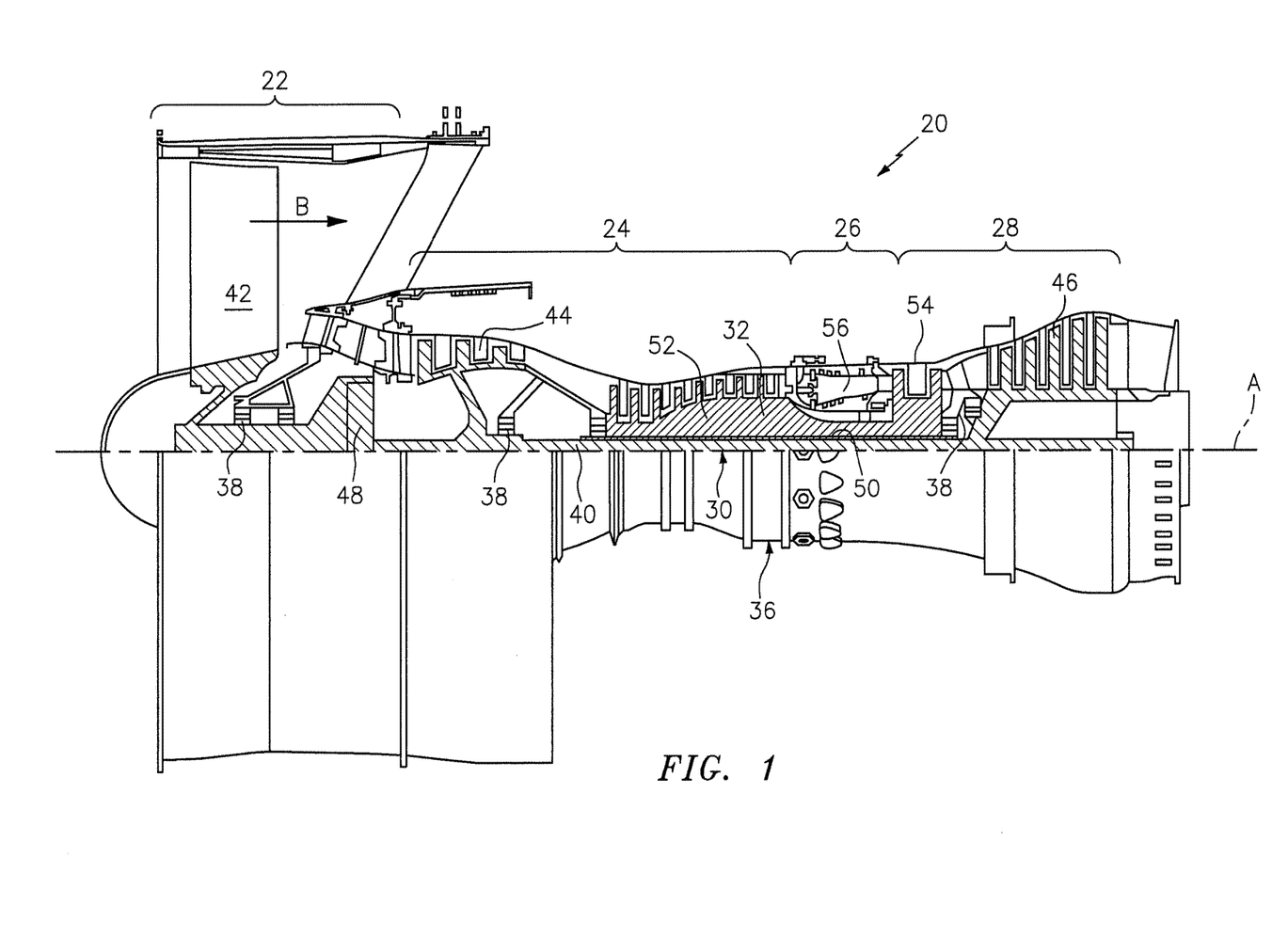
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath (B) while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
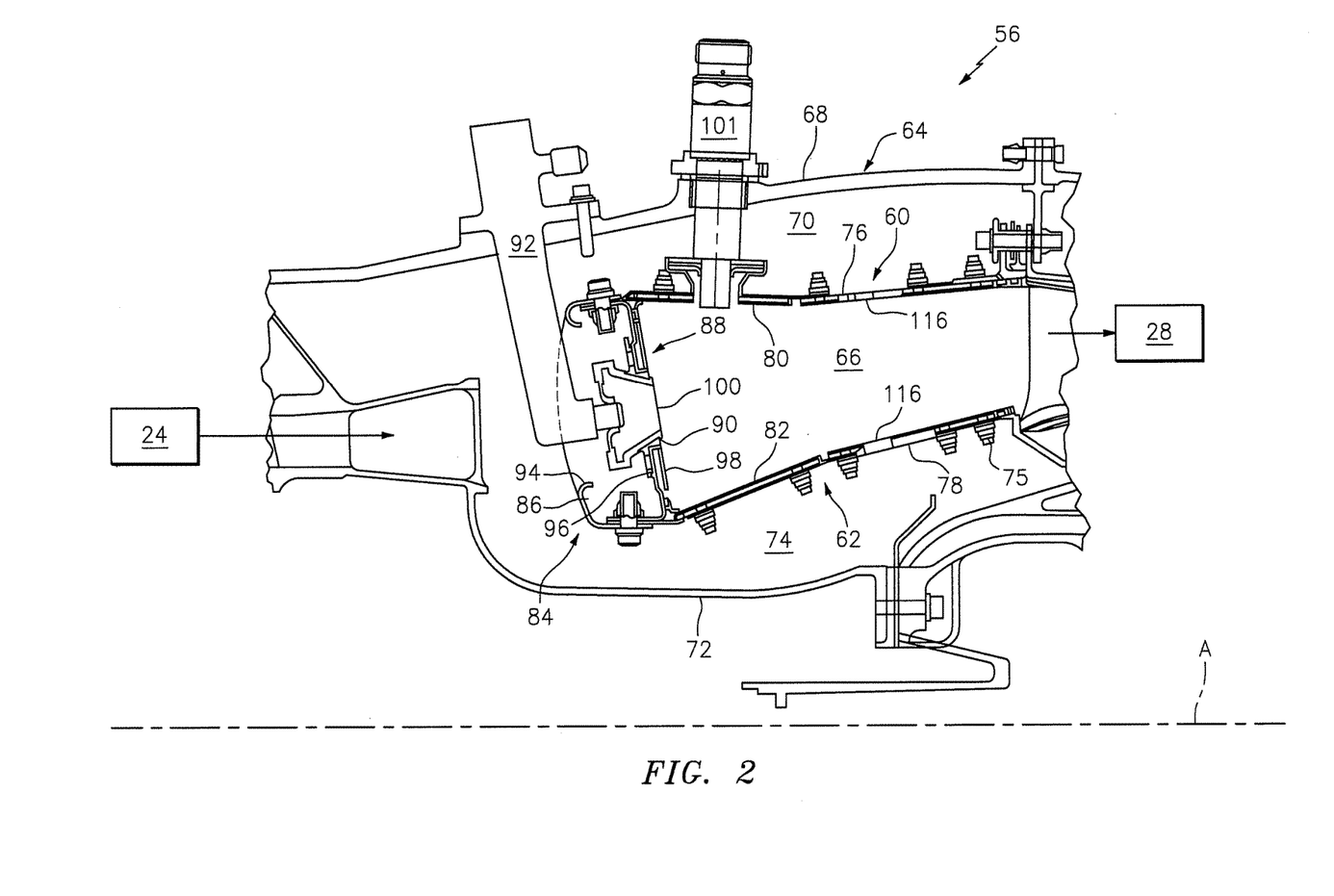
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forward-most ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

At least one igniter 101 extends through the diffuser case module 64, through the plenum 70, and through the wall assembly 60 where a distal tip of the igniter 101 is exposed to the combustion chamber 66. The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66 once ignited by the igniter 101.

Figure 3:
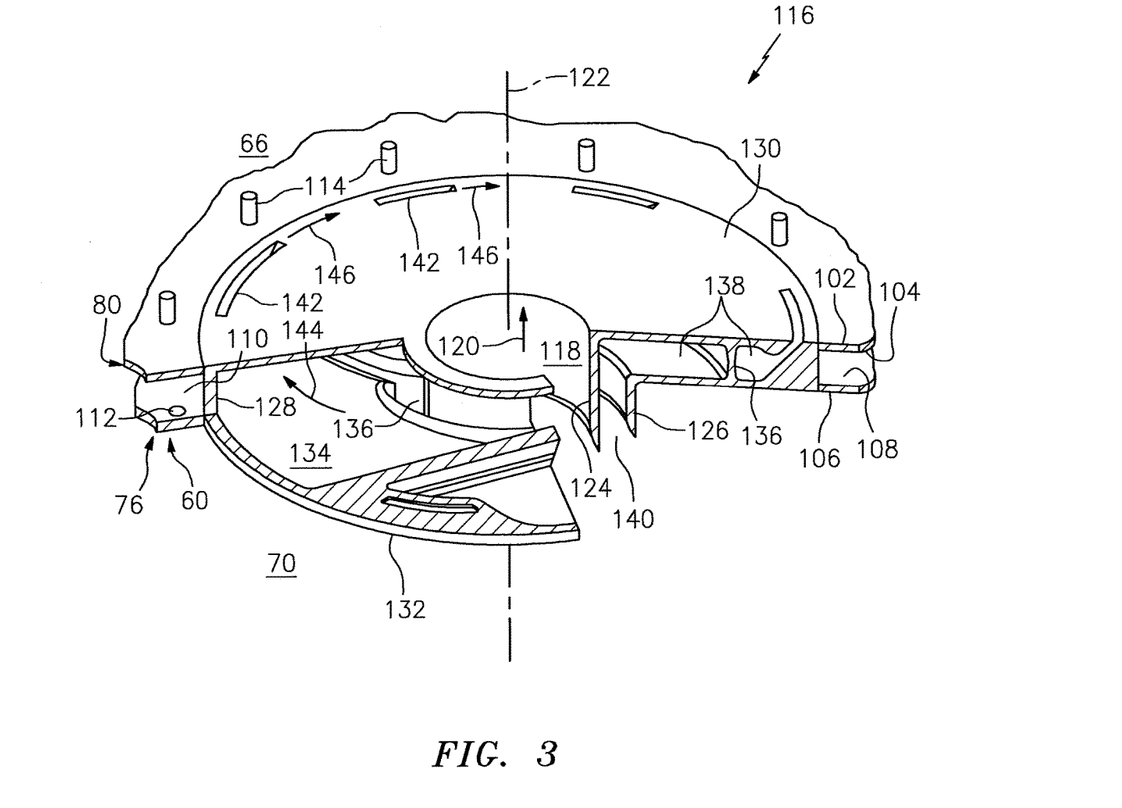
FIG. 3 is a perspective cross section of a cooled orifice structure according to one, non-limiting, example of the present disclosure.

Referring to FIGS. 2 and 3, the liner 80 of wall assembly 60 (which may include an array of panels) includes a hot side 102 that generally defines in-part a boundary of the combustion chamber 66 and an opposite cold side 104. The shell 76 includes an outer side 106 that faces and defines in-part a boundary of the cooling plenum 70 and an opposite inner side 108 that faces and is spaced from the cold side 104 of the liner 80. An annular cooling cavity 110 is located between and defined by the cold side 104 of the liner 80 and the inner side 108 of the shell 76.

The shell 76 may include a plurality of impingement holes 112 that flow cooling air from the cooling plenum 70 and into the cooling cavity 110 for flow impingement against the cold side 104 of the liner 80. From the cooling cavity 110, cooling air may flow through a plurality of film holes 114, communicating through the liner 80, and into the combustion chamber 66. The film holes 114 may be orientated to forth a cooling air film across the hot side 102 of the liner 80 to thermally protect the liner from hot combustion air gases. Unfortunately, and in traditional designs, the wall assembly 60 may further include orifices that communicate directly between the cooling plenum 70 and the combustion chamber 66. Such orifices may be generally isolated from the cooling cavity 110 and generally interrupt the more conventional cooling air films formed across the hot side 102 of the liner 80 by the film holes 114 creating difficulties in properly cooling the structures that surround the problematic orifice. Examples of such orifices may include dilution holes, igniter holes and other orifices.

Referring to FIG. 3, a non-limiting example of a cooled orifice structure 116 of the present disclosure is illustrated wherein an orifice 118 of the structure 116 is shown as a dilution hole in the outer wall assembly 60. However, it is understood that the same orifice structure 116 may be applied to the inner wall assembly 62 of the combustor 56, applied to igniter holes, or, applied in any application where orifices in a liner or hot side panel may interrupt cooling air films that protect such panels from excessive heat. In the present example, the orifice or dilution hole 118 of the orifice structure 116 generally functions to flow dilution air (see arrow 120) from the cooling plenum 70, through the wall assembly 60, via the orifice structure 116, and into the combustion chamber 66. The dilution air 120 may generally enter the combustion chamber 66 as a jet stream to improve combustion efficiency throughout the chamber 66 and may further serve to cool and/or control the temperature profile of combustion gases at the exit of the combustor 56.

The cooled orifice structure 116 may include a centerline 122 centered to the orifice 118, a circumferentially continuous inner wall 124 defining the orifice 118, a circumferentially continuous mid wall 126 spaced radially outward from the inner wall 124, a circumferentially continuous outer wall 128 spaced radially outward from the mid wall 126, a hot side panel 130 that may be generally flush with the liner 80, and a cold side panel 132 that may be generally flush with the shell 76 and spaced axially from the panel 130 with respect to the centerline 122. The hot side panel 130 may be substantially annular in shape and spans radially between an end or continuous edge of the outer wall 128 and the inner wall 124. The cold side panel 132 may also be substantially annular in shape and spans radially between an opposite end of the outer wall 128 and the mid wall 126. The hot and cold side panels 130, 132 may further define in-part the respective chamber 66 and plenum 70.

A substantially annular cooling cavity 134 of the structure 116 is radially defined by and between the hot and cold side panels 130, 132 and the inner and outer walls 124, 128. A plurality of helical vanes 136 are located in the cavity 134 with each vane extending longitudinally in a radially outward and circumferential direction. Each vane extends laterally between and is engaged to the opposing panels 130, 132 with opposite ends generally engaged to the respective inner and outer walls 124, 128. The cavity 134 is generally divided into a plurality of helical passages 138 defined laterally between adjacent vanes of the plurality of helical vanes 136 and the opposing panels 130, 132. Each helical passage 138 communicates between an inlet 140 and an outlet 142 for the flow of cooling air from the plenum 70 and into the combustion chamber 66. As each passage 138 spirals from the inlet 140 to the outlet 142, the cross-sectional flow area of the passage may decrease thereby accelerating the velocity of cooling air flow (see arrow 144). The inlet 140 may be annular in shape and common to all the passages 138 (i.e. singular and communicating with all the passages) and may be defined radially between a portion of the inner wall 124 that projects into the plenum 70 (i.e. extends beyond the cold side panel 132) and the mid wall or circumferentially continuous lip 126 of the cold side panel 132 that may project axially into the plenum 70.

The outlets 142 may be proximate to the outer wall 128 and in, thus communicating through, the hot side panel 130. Each outlet 142 communicates with a downstream end of a respective passage 138 and may generally be a slot that extends circumferentially with respect to the centerline 122.

Each outlet 142 may further be configured to form a cooling air film (see arrows 146) across the hot side panel 130 for thermal protection. It is further contemplated and understood that each outlet 142 may be a micro cooling circuit or other forms and orientations configured for the production of the cooling air film 146.

Although not illustrated, the orifice structure 116 may further include a plurality of cooling features projecting outward from the cooler side of the hot side panel 130. The cooling features may be distributed across the cooler side and in the cooling cavity 134 to thermally conduct heat out of the hot side panel 130. Each cooling feature may have a hub and a plurality of pedestals projecting outward from the hub in a grid-like pattern that may further provide structural support for the structure and add surface area for thermal convection via the cooling air flow 144 and turbulate the flow for enhanced cooling. The cooling features, combined, may than a vascular engineered lattice structure within the cooling cavity 134. Such vascular structures are taught in U.S. Provisional Patent Application 61/757,441, filed Jan. 28, 2013 that claims priority to U.S. Provisional Patent Application 61/746,893, filed Dec. 28, 2012; both assigned to the United Technologies Corporation, Hartford, Conn.; and, incorporated herein by reference in its entirety. Alternatively, each cooling feature may be a single pedestal generally projecting axially between and engaged to the opposing hot and cold side panels 130, 132.

Similar to the liner 80, the structure 116 may be manufactured of, for example, a nickel, titanium or cobalt based super alloy or other temperature resistant material. Furthermore, the structure may be brazed, or otherwise formed or attached, to the liner 80 with the hot side panel 130 coated with a ceramic or other temperature resistant material.

Because applications of the orifice structure 116 (e.g. combustor dilution holes) may be relatively small, manufacturing of the structure may be accomplished through additive manufacturing. Through additive manufacturing, the structure 116 may be formed as one unitary part. Individual features may be as small as about 0.010 inches (0.254 millimeters) in thickness or diameter while being generally non-porous, and various holes may be generally as small as 0.012 inches (0.305 millimeters) in diameter and/or as dictated by the filtering of any undesired particulate within surrounding airstreams. It is further understood and contemplated that minimal dimensions may be reduced with continued improvements in additive manufacturing processes.

Figure 4:
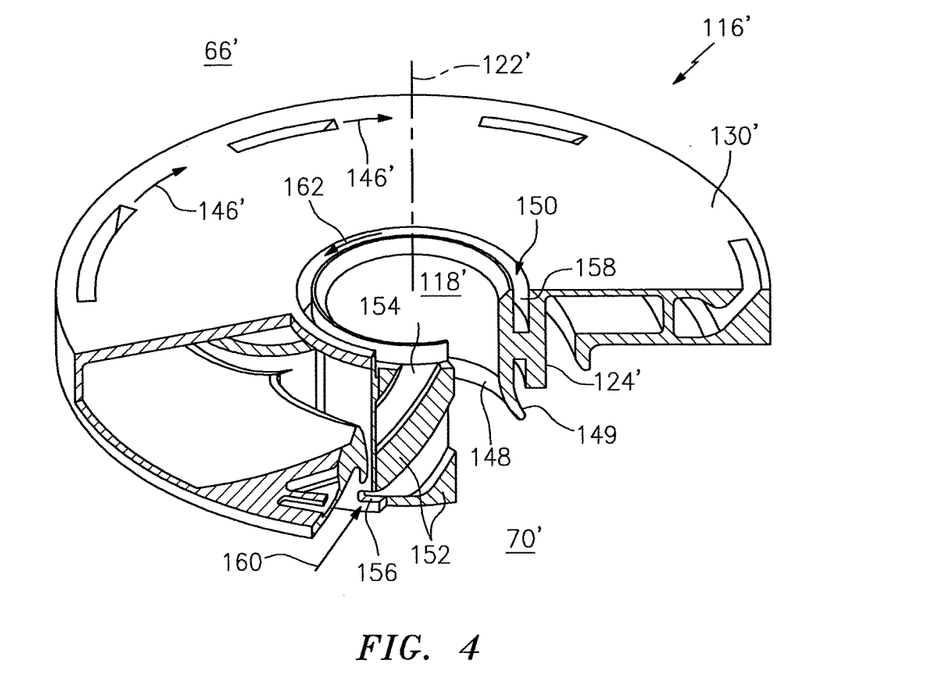
FIG. 4 is a perspective cross section of a second embodiment of a cooled orifice structure.

Referring to FIG. 4, a second embodiment of an orifice structure is illustrated wherein like elements of the first embodiment have like identifying numerals except with the addition of a prime symbol. The second embodiment of an orifice structure 116' may include a circumferentially continuous wall 148 generally centered about a centerline 122'. Wall 148 has a continuous, axial, end that may be substantially flush with a hot side panel 130' and an opposite, axial, end that may be substantially flush with a continuous end of the wall 124' and located in a plenum 70'. A generally annular cavity 150 is defined radially between an outward face 149 of the wall 148 and the wall 124', and contains a plurality of helical vanes 152. Each vane 152 may generally spiral in an axial and circumferential direction with respect to the centerline 122' and extends laterally between and may be engaged to the walls 124', 148. A plurality of helical channels 154 are defined between adjacent vanes of the plurality of helical vanes 152 with each channel 154 communicating between an inlet 156 and an outlet 158.

The inlets 156 may communicate directly with the plenum 70' and may be in a distal end portion of the wall 124' that projects into the plenum 70'. Each inlet 156 is spaced circumferentially from the next adjacent inlet and cooling air flow (see arrow 160) is directed from the plenum 70', in a radial inward direction, and into the respective channel 154, where the air flow is redirected into an axial and circumferential direction.

The outlet 158 may communicate directly with a combustion chamber 66', may be common to all the channels 154, may be a trough and generally annular in shape, and may be defined radially between the walls 124', 148. As the combined cooling air flow enters the annular outlet 158, the cooling air flow (see arrow 162) may dwell within the trough 158 thereby improving heat transfer from the inner most wall 148 to the cooling air. This dwelling air flow 162 may be directed in an opposite or the same circumferential direction as the circumferential direction of an air flow 146'.

Figure 5:
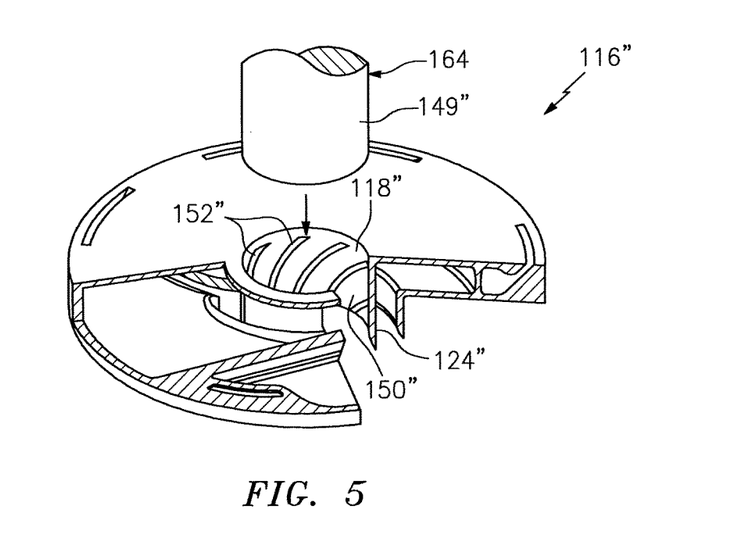
FIG. 5 is a perspective, exploded, cross section of a third embodiment of a cooled orifice structure.

Referring to FIG. 5, a third embodiment of an orifice structure is illustrated wherein like elements of the first embodiment have like identifying numerals except with the addition of a double prime symbol. The third embodiment of an orifice structure 116" may include an outward face 149" that is carried by a structure 164 configured to be inserted through an orifice 118". The structure 164 may generally be a tip of an igniter 101 (see FIG. 2). When assembled, an annular cavity 150" is defined between the face 149" and a wall 124". A plurality of helical vanes 152" may be in the cavity 150", engaged to the wall 124" and in close proximity to, or contact with, the face 149".

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:
1. A self-cooled orifice structure comprising:
a hot side panel;
a cold side panel spaced from the hot side panel;
a continuous first wall extending axially between the hot and cold side panels and spaced radially outward from a centerline;
a continuous second wall having an outward face and an opposite inward face, wherein the inward face defines an orifice that is a dilution hole of a combustor; and
a first plurality of helical vanes projecting laterally, radially, inward from the first wall;

the outward face extending axially between the hot and cold side panels and spaced radially inward from the first wall;

wherein a plurality of helical channels are defined radially between the outward face and the first wall and defined laterally between respective adjacent vanes of the first plurality of helical vanes, and communicate through the hot and cold side panels.

2. A self-cooled orifice structure comprising:
a hot side panel;
a cold side panel spaced from the hot side panel;
a continuous first wall extending axially between the hot side panel and the cold side panel and spaced radially outward from a centerline;
a first plurality of helical vanes projecting laterally, radially, inward from the first wall; and
an outward face extending axially between the hot and cold side panels and spaced radially inward from the first wall;
wherein a plurality of helical channels are defined radially between the outward face and the first wall and defined laterally between respective adjacent vanes of the first plurality of helical vanes, and communicate through the hot and cold side panels; and
wherein the outward face is carried by a combustor igniter projecting through the hot and cold side panels.

3. The self-cooled orifice structure set forth in claim 1, wherein the hot side panel is engaged to the first wall and spaced radially outward from the second wall.

4. The self-cooled orifice structure set forth in claim 1 further comprising:
a second plurality of helical vanes projecting radially outward from the first wall and disposed at least in-part between the hot and cold side panels.

5. The self-cooled orifice structure set forth in claim 4 further comprising:
a continuous third wall spaced radially outward from the first and second walls and extending axially between the hot and cold side panels; and
wherein each one the second plurality of helical vanes extend radially between the first and third walls.

6. The self-cooled orifice structure set forth in claim 4, wherein an annular trough is defined radially between the outward face of the second wall and the first wall, and communicates with and is located downstream of the plurality of helical channels.

7. The self-cooled orifice structure set forth in claim 5, wherein a plurality of helical passages are defined at least between the first and third walls and respective adjacent vanes of the second plurality of helical vanes.

8. The self-cooled orifice structure set forth in claim 7, wherein each one of the plurality of helical passages communicate between a common annular inlet generally defined between the first wall and the cold side panel, and an outlet communicating through the hot side panel proximate to the third wall.

9. The self-cooled orifice structure set forth in claim 8, wherein the outlet is configured to, form a film of cooling air across the hot side panel.

10. The self-cooled orifice structure set forth in claim 8, wherein the outlet is a micro cooling circuit.

11. The self-cooled orifice structure set forth in claim 1, wherein the first and second walls are generally flush with the hot side panel and project axially beyond the cold side panel.

12. A self-cooled orifice structure comprising:
a hot side panel;
a cold side panel spaced from the hot side panel;
a continuous first wall extending axially between the hot side panel and the cold side panel and spaced radially outward from a centerline;
a continuous second wall having an outward face and an opposite inward face, wherein the inward face defines an orifice, and wherein the first and second walls are generally flush with the hot side panel and project axially beyond the cold side panel; and
a first plurality of helical vanes projecting laterally, radially, inward from the first wall;
the outward face extending axially between the hot and cold side panels and spaced radially inward from the first wall;
wherein a plurality of helical channels are defined radially between the outward face and the first wall and defined laterally between respective adjacent vanes of the first plurality of helical vanes, and communicate through the hot and cold side panels; and
wherein each one of the plurality of helical channels communicate through a respective inlet in the first wall beyond the cold side panel and a common annular outlet generally defined between the hot side panel and the second wall.

13. A self-cooled orifice structure comprising:
a continuous first wall spaced radially outward from a centerline;
a continuous second wall spaced radially outward from the first wall;
a hot side panel;
a cold side panel spaced axially from the hot side panel with the first and second walls extending axially between the hot and cold side panels; and
a plurality of helical vanes with each vane extending radially between the first and second walls and axially between the hot and cold side panels;
wherein a plurality of helical passages are defined at least between the first and second walls and respective adjacent vanes of the plurality of helical vanes; and
wherein the plurality of helical passages communicate between at least one inlet generally defined between the first wall and a continuous lip of the cold side panel, and an outlet communicating through the hot side panel proximate to the second wall.

14. The self-cooled orifice structure set forth in claim 13, wherein each outlet is configured to form a film of cooling air across the hot side panel.

15. The self-cooled orifice structure set forth in claim 14 further comprising:
a second plurality of helical vanes projecting laterally, radially, inward from the first wall.

* * * * *

UNITED STATES PATENT AND TRADEMARK OFFICE
CERTIFICATE OF CORRECTION

PATENT NO. : 9,810,148 B2
APPLICATION NO. : 14/807602
DATED : November 7, 2017
INVENTOR(S) : Tracy A. Propheter-Hinckley et al.

It is certified that error appears in the above-identified patent and that said Letters Patent is hereby corrected as shown below:

In the Specification

Column 5
Line 58, please delete "forth" and insert --form--

Column 7
Line 19, please delete "than" and insert --form--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*